United States Patent [19]
Parks et al.

[11] 3,950,763
[45] Apr. 13, 1976

[54] CATHODE RAY TUBE LIGHTHEAD

[75] Inventors: Robert G. Parks, Mission Viejo; Howard E. Brewer, Santa Ana, both of Calif.

[73] Assignee: California Computer Products, Inc., Anaheim, Calif.

[22] Filed: Oct. 29, 1974

[21] Appl. No.: 518,713

[52] U.S. Cl. .................... 354/4; 354/6; 346/110 R
[51] Int. Cl.² .................. G03B 41/00; G03B 19/00
[58] Field of Search ............... 354/4, 6; 346/110 R

[56] References Cited
UNITED STATES PATENTS

| | | |
|---|---|---|
| 3,273,476 | 9/1966 | Haynes ................................ 354/6 |
| 3,517,592 | 6/1970 | Kollar ................................. 354/6 |
| 3,695,154 | 10/1972 | Webster .............................. 354/4 |
| 3,731,610 | 5/1973 | Kyte .................................. 354/6 |
| 3,781,850 | 12/1973 | Gicca ................................. 354/6 |

*Primary Examiner*—John Gonzales

[57] ABSTRACT

The specification discloses a cathode ray lighthead for an electromechanical plotter. The head is adapted to be mounted upon the carriage of an X-Y Plotter in lieu of a conventional stylus. Plotting is effected on a photographic film through a combination of motions which include sweeping the beam in addition to mechanically moving the carriage. The system will produce both straight and curved lines of various widths, as well as symbols having any desired orientation.

3 Claims, 6 Drawing Figures

("PAINT" OR LINE MODE)

(SYMBOL OR PLOT MODE)

CATHODE RAY TUBE LIGHTHEAD

BACKGROUND OF THE INVENTION

There exists the need to produce lines and/or graphic symbols on photographic film for such end uses as maps, printed circuit card masters, encoder masters, etc. Currently this is done by using a high energy, single source of light such as a flash tube, laser, or other focused, point-light source. The current methods usually use some form of aperture to shape the beam by extrusion, and some sort of opto-electrical/mechanical method of rotating the extruded beam. Reference is made to U.S. Pat. No. 3,724,347 entitled "Apparatus for Selectively Exposing A Photosensitive Surface" by H. J. Gerber.

SUMMARY OF THE INVENTION

The present invention comprises a cathode ray tube and its associated parts, arranged such that it can be moved in an X-Y motion in relation to a piece of film, or such that a piece of film can be moved in relation to the tube, or each moved in an X or Y or X/Y motion with respect to each other. In one mode of operation (line drawing) the electronics driving the cathode ray tube sweeps a line perpendicular to the relative X-Y motion of the light-head/film such that each increment of X-Y movement produces a given fraction of a sweep on the cathode ray tube. In another mode of operation (symbol generation), the symbol is drawn in an incremental mode on the cathode ray tube. The image on the cathode ray tube is focused on the film.

Figure 1:
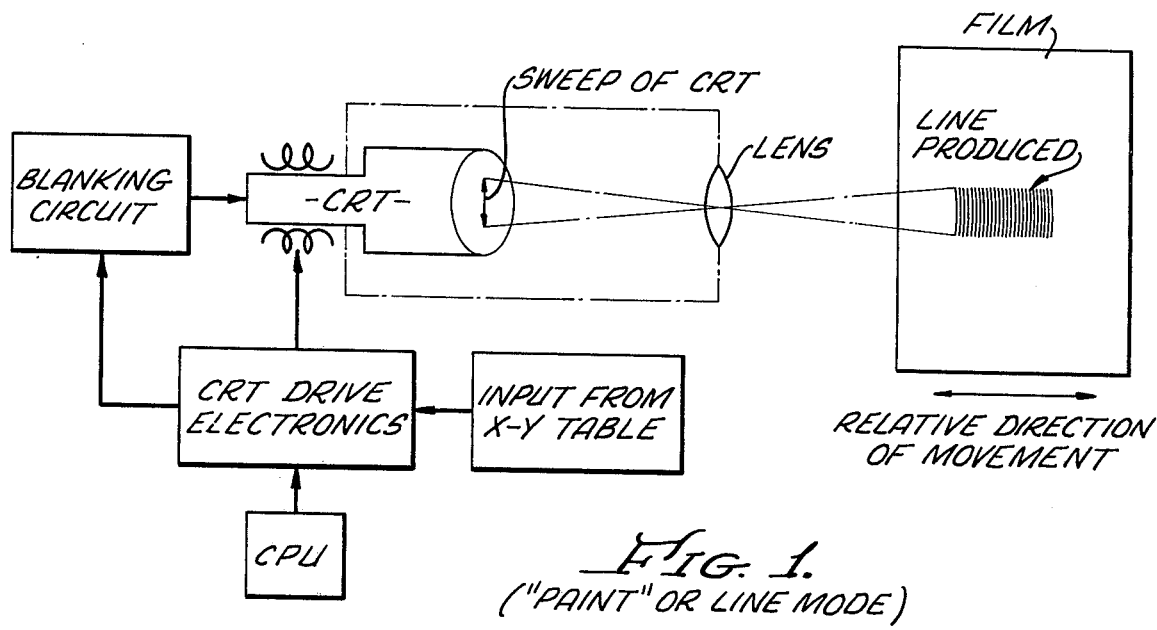
FIG. 1 shows a diagram of the operative elements of the invention for plotting a continuous line.

DESCRIPTION OF A PREFERRED EMBODIMENT:

Adverting to the drawings, and particularly FIG. 1, there is shown a block diagram of the elements required for the "paint" or line mode. The width of the line produced on the film is a function of the sweep width on the cathode ray tube and the minification of the lens system. The cathode ray tube drive electronics is given a line width signal and sweeps an appropriate distance each time that it receives a feedback signal from the X-Y positioning device indicating that an increment of X (or Y) motion has been taken. As a consequence the system is independent of velocity. Note is taken in the electronics as to whether or not the movement is pure X, pure Y, or a combination. If the movement is a combination step, the electronics provides a sweep on the cathode ray tube to compensate for the greater distance traversed. For example, if the sweep electronics are set to produce one sweep for every six increments of movement parallel to either the X or Y axis, then there would be one sweep for each four combination steps (approx. 6/ $\sqrt{2}$).

Figure 6:
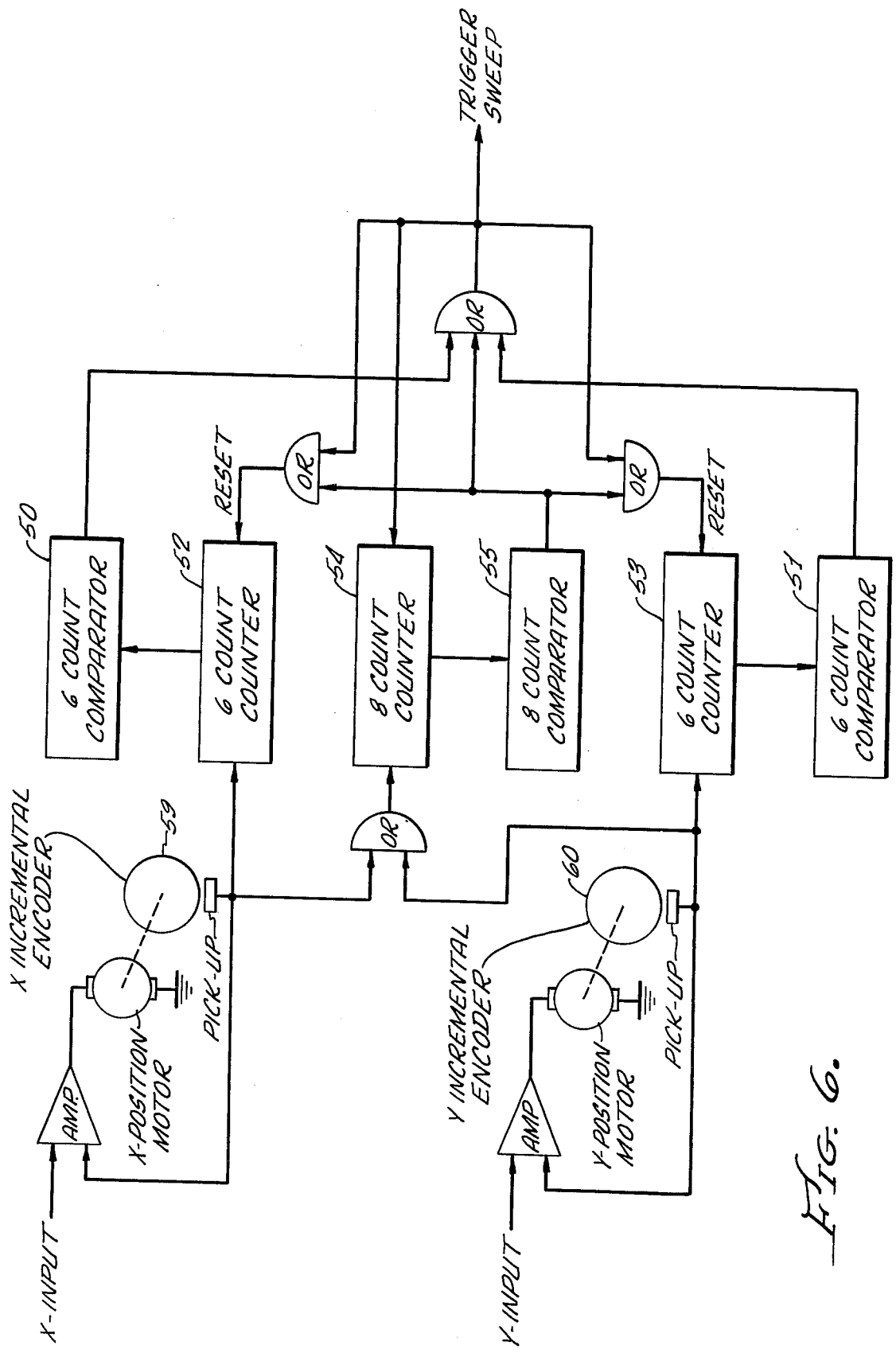
FIG. 6 shows a block diagram of the logic for synchronizing the sweep to the plotter velocity.

The logic for synchronizing the sweep to the plotter movement is shown in FIG. 6. Count comparators 50 and 51 generate a signal whenever their respective counters 52 and 53 reach "six" — thus indicating a plotter movement parallel to either the X or Y axis respectively. If a combination move is executed, counter 54 will reach the count of "eight" prior to counters 52 and 53 reaching a count of "six", thus causing the count comparator 55 to generate a signal to trigger the sweep. For example, when moving at an angle of 45° with respect to the primary cartesian X or Y axis, each encoder (59 and 60) will generate four pulses for a total of "eight". Since the distance traversed by the plotter is greater by $\sqrt{2}$ for each combination step (at 45°) the sweeps must occur at 6/ $\sqrt{2}$ ≈ 4 in order to have the same overlap.

Figure 2:
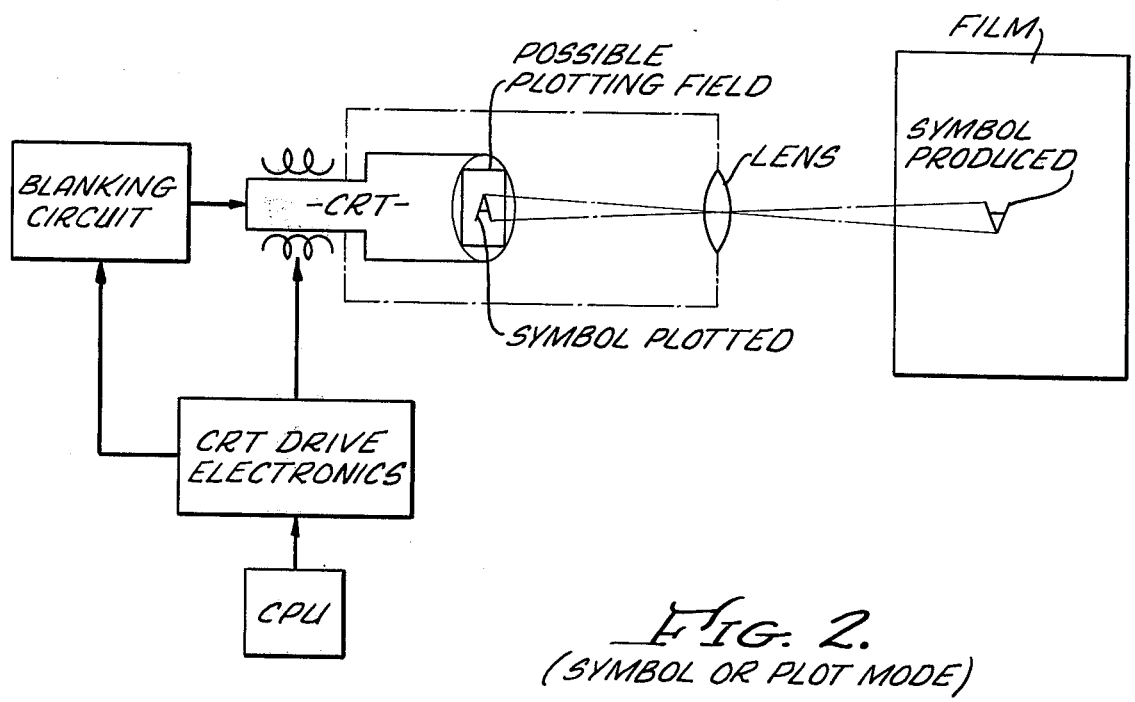
FIG. 2 shows a diagram of the operative element of the invention for producing symbols.

FIG. 2 shows the symbol or plot mode. For this mode, there is no motion between the lighthead and the film. The symbol or image is produced by incrementally drawing any symbol, limited only by the system resolution, on the cathode ray tube via the cathode ray tube electronics. No masks are required.

Figure 3:
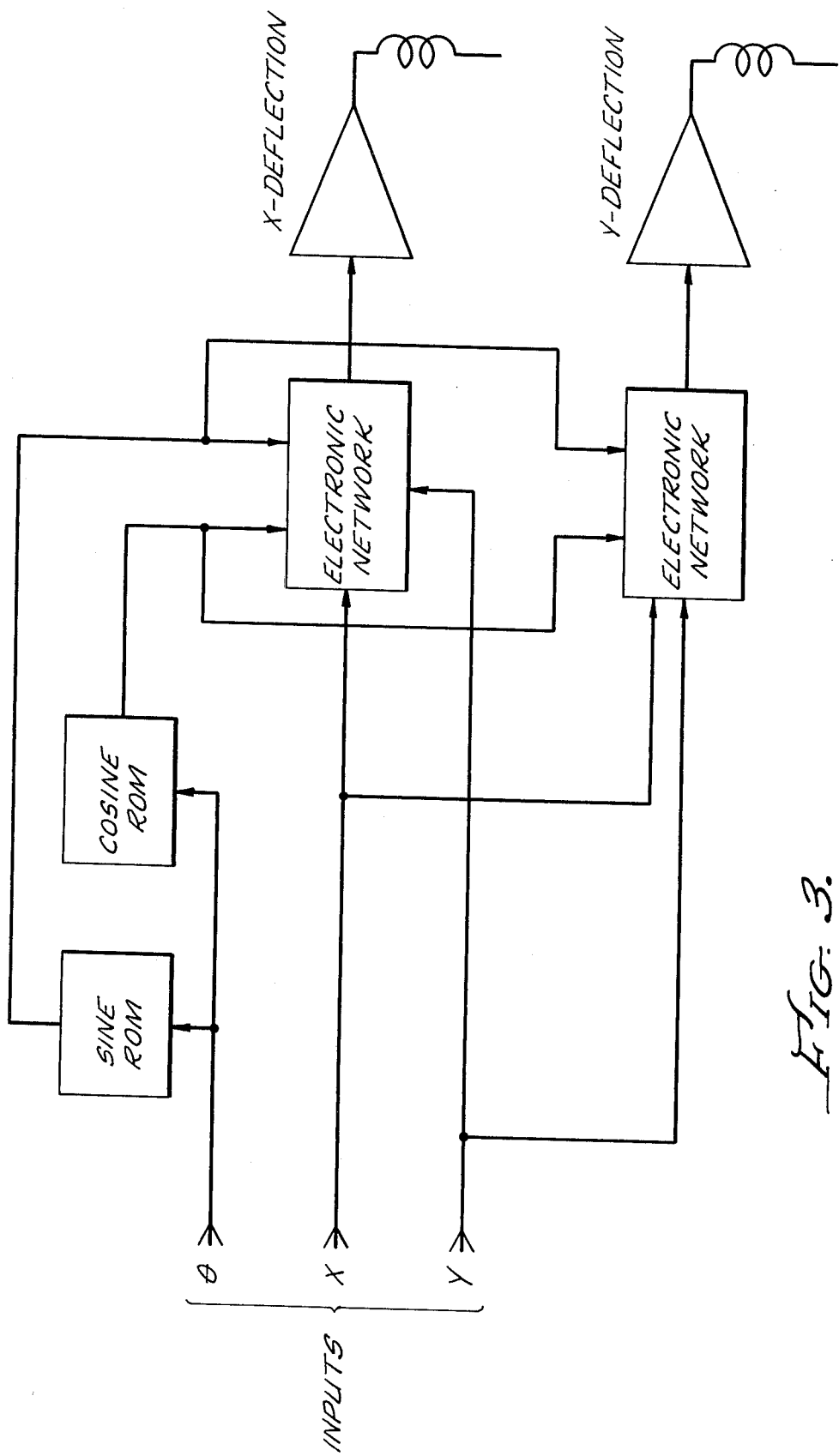
FIG. 3 shows a block diagram of the symbol rotation circuitry.

It is necessary to be able to rotate the image about its center line such that the sweep is always perpendicular to the direction of relative film movement in the "paint" or line mode. It is also necessary to be able to rotate a symbol through 360°. The way this is accomplished is shown in FIG. 3. Three inputs are presented to the cathode ray tube drive electronics; X-magnitude, Y-magnitude, and angle of rotation 0. The electronic network modifies the signal by:

$$\pm X(\text{or } Y) * \cos 0 \pm Y(\text{or } X) * \sin 0$$

the inputs and signs depending upon the axis and quadrant of rotation.

Figure 4:
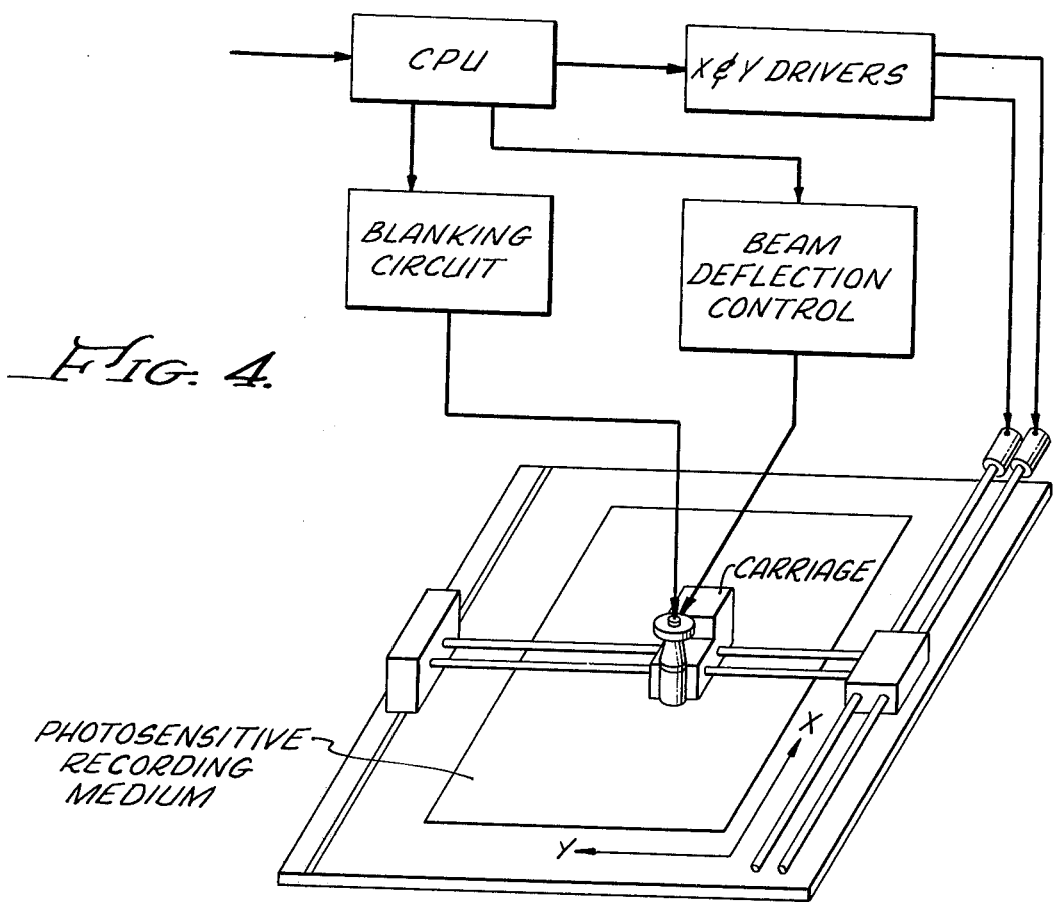
FIG. 4 shows a perspective view of the mechanical relationship of the elements.
Figure 5:
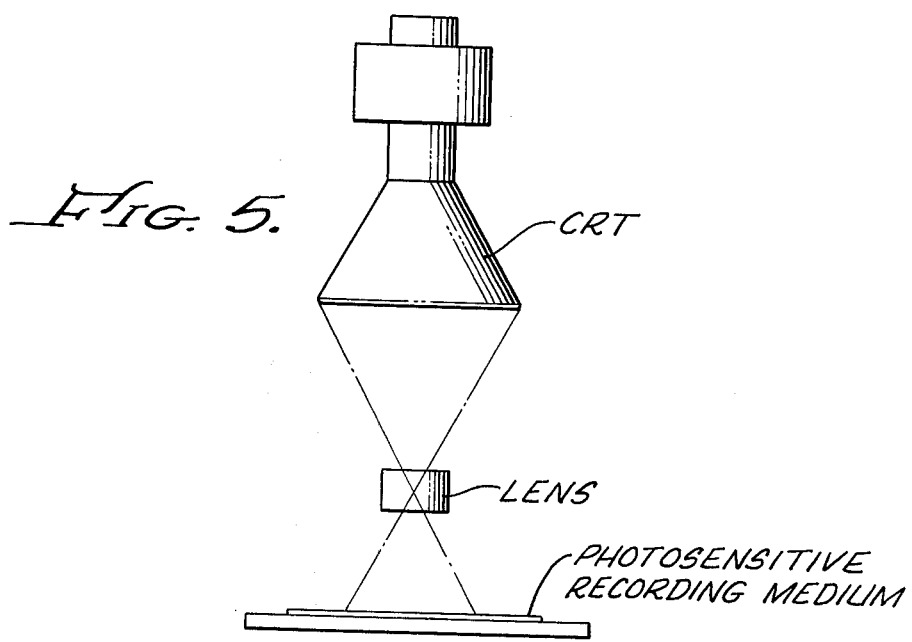
FIG. 5 shows a side elevation of the positional relationship of the CRT to the plotting surface.

FIGS. 4 and 5 show the physical relationship of the CRT to the plotter. The CRT is positioned immediately above the photosensitive material, and moved parallel to the plotting surface as the carriage is moved about its course in executing the commands furnished by the CPU.

Although the invention has been shown and described in conjunction with an X-Y plotter, it will be evident that it could also be adapted for use with a wide variety of plotting instruments which require a low inertia light source. Thus, although a preferred embodiment has been shown and illustrated, it will be understood that the invention is not limited thereto, and that numerous changes, modifications, and substitutions may be made without departing from the spirit of the invention.

We claim:

1. A light source including a cathode ray tube of the type having a cathode screen, and control grid, wherein the improvement comprises:

means for physically moving said cathode ray tube in either of two orthogonal plotting axes relative to a stationary photosensitive recording medium whereby said cathode ray tube may be used to graphically record on the photosensitive recording medium;

means for generating a transverse sweeprate of the cathode ray beam in a direction which is substantially orthogonal to the directional motion of said cathode ray tube, and means for proportioning the number of transverse deflections of the beam so as to correspond with the relative velocity of said cathode ray tube, said means comprising:

logic means responsive to the said means for physically moving said cathode ray tube, for adjusting the frequency of the transverse sweep rate in response to signals indicative of whether said cathode ray tube is being moved parallel to a major plotting axis or whether it is executing a combination move at 45° with respect to a major plotting axis.

2. The apparatus recited in claim 1 including means for maintaining said cathode ray tube in a stationary position relative to a photosensitive medium and,
  means for drawing a symbol on the face of said cathode ray tube and,
  means for focusing the image so formed on the photosensitive recording medium.

3. The apparatus recited in claim 2 including means for rotating the image on said cathode ray tube.

* * * * *